US005737838A

United States Patent [19]

Niimi et al.

[11] Patent Number: 5,737,838

[45] Date of Patent: Apr. 14, 1998

[54] METHOD OF MAKING A PISTON UNIT FOR AN INTERNAL COMBUSTION ENGINE

[75] Inventors: Hiromi Niimi, Kariya; Yasuhiro Kawabata, Anjo; Soichi Hara, Toyota; Tomohiro Sawada, Nagoya, all of Japan

[73] Assignee: Aisin Seiki Kabushiki Kaisha, Aichi-pref., Japan

[21] Appl. No.: 758,858

[22] Filed: Dec. 2, 1996

[30] Foreign Application Priority Data

Nov. 30, 1995 [JP] Japan .................................... 7-313124

[51] Int. Cl.[6] .................................................. B23P 15/10

[52] U.S. Cl. ...................................................... 29/888.047

[58] Field of Search ................................ 29/888.047, 559

[56] References Cited

U.S. PATENT DOCUMENTS

| | | | |
|---|---|---|---|
| 2,685,729 | 8/1954 | Daub | 29/888.047 |
| 3,264,717 | 8/1966 | Class et al. | 29/888.047 |
| 3,413,897 | 12/1968 | Atkin | 29/888.04 |
| 4,559,685 | 12/1985 | Hara et al. | 29/888.047 |
| 4,776,075 | 10/1988 | Kawabata et al. | 29/888.047 |
| 4,891,875 | 1/1990 | Soichi et al. | 29/559 |

FOREIGN PATENT DOCUMENTS

| | | |
|---|---|---|
| 4-26930 | 5/1992 | Japan . |
| 7-23560 | 5/1995 | Japan . |

*Primary Examiner*—Erick R. Solis
*Attorney, Agent, or Firm*—Hazel & Thomas

[57] ABSTRACT

The method of making a piston unit for an internal combustion engine incorporates the steps of pinching a melting core in a mold cavity of a piston mold wherein the melting core includes an inner ring that forms a ring shaped passage within a piston body, an outer ring and a plurality of coupling portions connected with between the inner ring and the outer ring. The method further includes pouring molten metallic alloy into the cavity and solidifying therein, removing the outer ring of the melting core, filling the space left by removal of the outer ring with reinforced material, and then melting the inner ring and the coupling portions of the melting core.

6 Claims, 2 Drawing Sheets

METHOD OF MAKING A PISTON UNIT FOR AN INTERNAL COMBUSTION ENGINE

FIELD OF THE INVENTION

The present invention relates to a method of making a piston unit for an internal combustion engine, especially a piston unit that has a ring shaped passage made by using a melting core.

BACKGROUND OF THE INVENTION

In a conventional piston unit for an internal combustion engine, a piston is heated. Therefore, there is some possibility that the ring may stick and a piston ring may be damaged. The piston has a ring-shaped oil passage into the top of the piston to prevent the ring from sticking or damage to the piston ring. A method of making the piston unit is disclosed in, for example, Japanese Patent Application Number 4-26930 and Japanese Utility Patent Application Number 7-23560.

In Japanese Patent Application Number 4-26930, there is disclosed a method of making a piston unit that uses three parts for the mold core. The mold core is composed of one center core and a pair of side cores. The center core has two support pins to maintain a ring shaped melting core. The melting core is made of salt. Essential amounts of molten aluminum alloy are poured in the cavity and solidifies, and then after tire mold cores and the support pins are pulled out, the melting core melts. When the support pins are pulled out, the piston has two connecting holes between the ring shaped oil passage and internal room of the piston. The connecting holes are used for circulating oil. However, the locations of the connecting holes are decided where the support pins are placed. In addition, the support pins must be placed in the same direction as the direction the molds are pulled out. Therefore, it is very difficult to make a plurality of connecting holes in suitable positions.

In Japanese Utility Patent Application Number 7-23560, there is also disclosed a method of making a piston unit. The piston unit has a strut steel which prevents heat expansion of the outside diameter of the piston. The strut steel has four support members to maintain a melting core. Molten aluminum allow is poured into the cavity and solidifies. Afterwards connecting holes are drilled from an inside space of the piston to the melting core and then the melting core is melted. However, this piston unit has four support members attached to the strut steel. Therefore, the number of parts of the strut steel is increased and thus makes the piston unit expensive to manufacture.

SUMMARY OF THE INVENTION

Accordingly, it is an object of the present invention to provide a method of making a piston unit for an internal combustion engine without the foregoing drawbacks.

In accordance with the present invention, the method of making a piston unit for an internal combustion engine comprises the steps of, pinching a melting core in a cavity of a piston mold, the melting core which includes an inner ring making a ring shaped passage within a piston body, an outer ring and a plurality of coupling portions connected between the inner ring and the outer ring, pouring molten metallic alloy into the cavity and solidifying therein, removing the outer ring of the melting core therefrom, filling the removed space with reinforced material, and then melting the inner ring and the coupling portions of the melting core.

Other objects and advantages of invention will become apparent during the following discussion of the accompanying drawings.

BRIEF DESCRIPTION OF THE DRAWING FIGURES

The foregoing and additional features of the present invention will become more apparent from the following detailed description of preferred embodiments thereof when considered with reference to the attached drawings, in which.

DETAILED DESCRIPTION OF THE PREFERRED EMBODIMENTS

Figure 1:
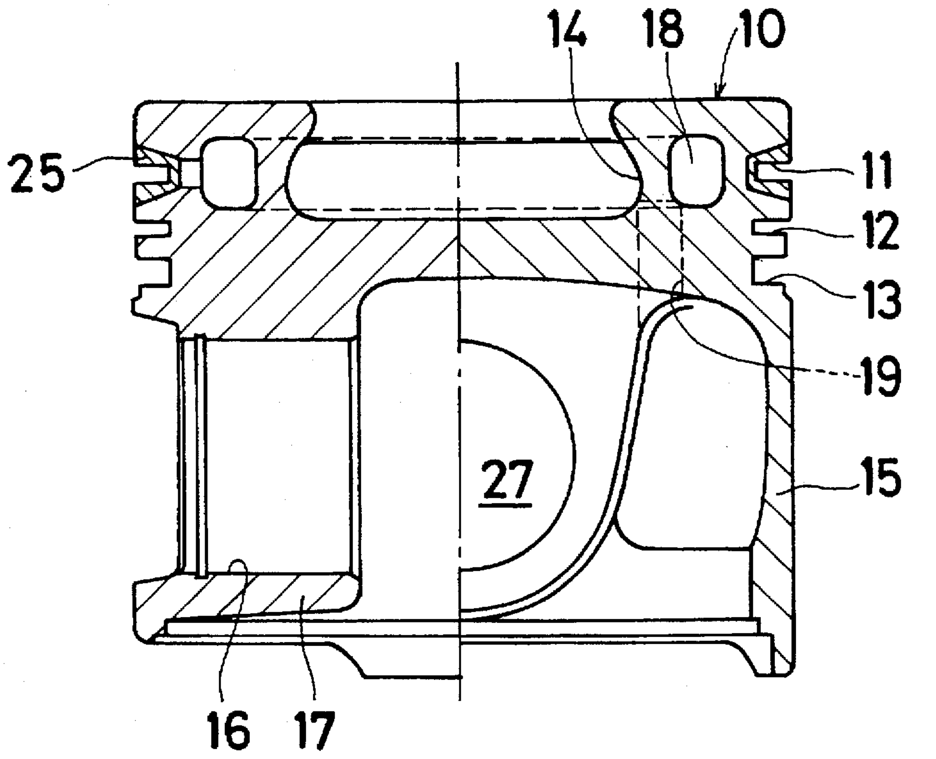
FIG. 1 is a sectional view of a piston unit for an internal combustion engine made by a method in accordance with the prevent invention.

Referring to FIG. 1, there is shown a preferred embodiment of the piston unit for an internal combustion engine, which is made from the method of the present invention.

The piston unit 10 is made of aluminum alloy. There are the top ring groove 11, second ring groove 12 and oil ring groove 13 defined on the upper end of the outside surface of the piston 10. These ring grooves 11, 12, and 13 are made by a groover. The top ring groove 11 is made on a ring portion 25. The ring portion 25 is formed of reinforced material, for example, an Fe based alloy or an Fe—Cr—C based alloy. A concavity 14 is made on the top of the piston unit 10, and a hollow cylindrical boss member 15 is made downwardly. The boss member 15 has an open end at its bottom portion, and there is an internal cavity 27 made in the boss member 15. On opposite sides of the boss member 15, a pair of thick portions 17 are formed which face each other. The thick portions have a junction hole 16 respectively.

There is a ring shaped passage 18 within the top of the piston unit 10. The ring shaped passage 18 is connected with an oil entrance passage 19 and an oil exit passage (not shown). The oil flows through the oil entrance passage 19, the ring shaped passage 18 and the oil exit passage and cools the piston unit 10.

The method of making the above described piston unit 10 of the present invention will be explained.

Figure 2:
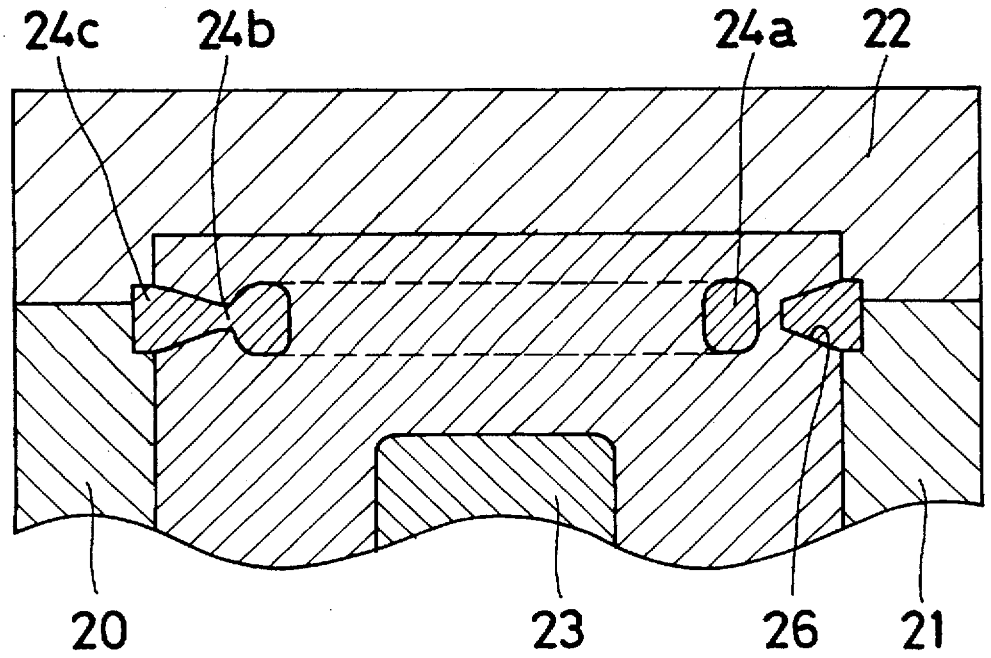
FIG. 2 is a sectional view of molds in accordance with the prevent invention.

As shown in FIG. 2, the cavity of the piston unit 10 is formed by two side molds 20, 21, an upper mold 22 and a mold core 23. The mold core 23 is divided into a plurality of cores (not shown) for pulling out.

Figure 3:
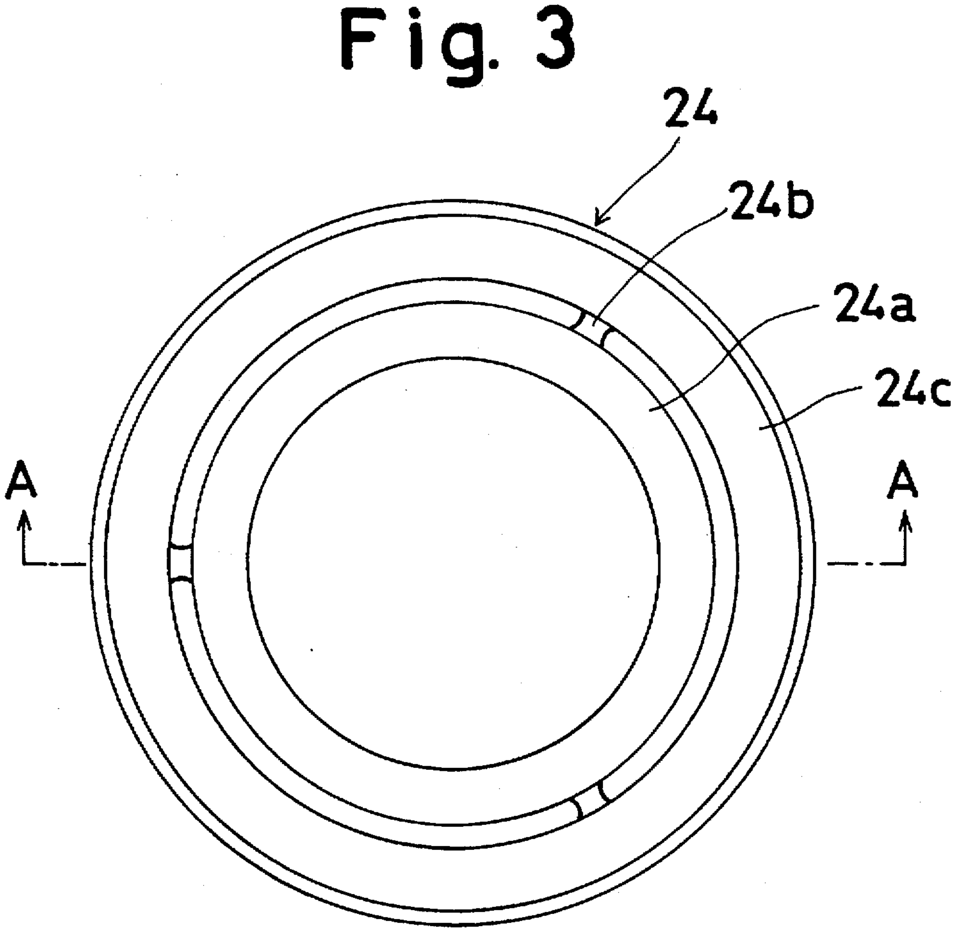
FIG. 3 is a plan view of a melting core in accordance with the present invention.
Figure 4:
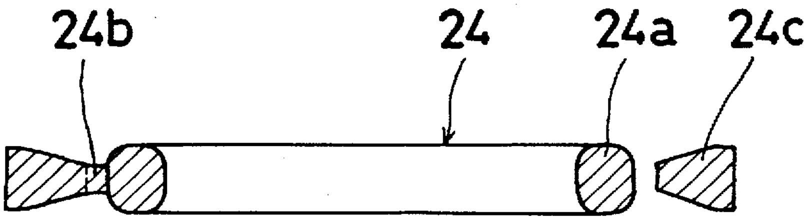
FIG. 4 is a section taken along the line A—A in FIG. 3 in accordance with the present invention.

As shown in FIG. 3 and FIG. 4, a melting core 24 consists of an inner ring **24*a* which makes the ring shaped passage 18, an outer ring 24*c* which is concentric with the inner ring 24*a*, and three coupling portions 24*b*. The coupling portions 24*b* are connected with the inner ring 24*a* and the outer ring 24*c*. As shown in FIG. 2, there are three coupling portions 24*b*, but it is not limited to three. However, there should be at least three coupling portions. The coupling portions 24*c* are placed with the same interval around the outside of the inner ring 24*a* (the inside of the outer ring 24*c*). The melting core 24** is formed by sintering after pressing salt or solidifying after pouring molten salt into the cavity.

As shown in FIG. 2, when making the piston unit 10, the inner ring **24*a* is located into the top of the piston unit 10. The outer ring 24*c* of the melting core 24 is pinched between the side molds 20, 21 and the upper mold 22. The upper and bottom surfaces of the outer ring 24c have taper surfaces and level surfaces. The taper surfaces make the outer ring 24c thicker by several degrees from inside to outside. The level surfaces is located at the outer end of the outer ring 24c so as to be pinched between the side molds 20, 21 and the upper mold 22**.

After the melting core 24 is pinched between the side molds 20, 21 and the upper mold 22, molten aluminum based alloy is poured into the cavity. The molten aluminum based alloy is cooled therein to solidify the piston unit 10. After solidifying, the side molds 20, 21 are moved to the left and right directions in the FIG. 2, and the upper mold 22 and the mold core 23 are moved up and down, respectively.

Next, the outer ring 24c or the outer ring 24c together with the coupling portions 24h is removed. Therefore, this makes the removed space to be a ring concavity 26, which cross section is V groove. If the coupling portions 24b are not removed with the outer ring 24c, it is able to dissolve, them by splashing pressurized water from the ring concavity 26.

The ring concavity 26 is filled with the reinforced material to make a reinforced ring. The reinforced ring prevents the first ring from slipping out as a result of the heat. The method of filling is welding or deposition. The reinforced material is an Fe-based alloy or an Fe—Cr—C based alloy. Therefore, neither cutting or grinding is needed to make the reinforced ring.

Further, the oil entrance passage 19 and the oil exit passage are drilled from the internal room 27. The oil entrance passage 19 and the oil exit passage are in suitable position for the cooling oil flowing through the ring shaped passage 18. The pressurized water flows through the inner ring 24a by coming in through the oil entrance passage 19 and out by the oil exit passage. The inner ring 24a is melted by the pressurized water and the ring shaped passage 18 is formed.

Lastly, the first ring groove 11, the second ring groove 12 and the oil ring groove 13 are cut on the external surface of the piston unit 10. And the external surface of piston unit 10 is ground.

While the invention has been described in conjunction with one of its preferred embodiments, it should be understood that changes and modifications may be made without departing from the spirit and scope of the appended claims.

What is claimed is:

1. The method of making a piston unit for an internal combustion engine, comprising the steps of:

pinching a melting core in a mold cavity of a piston mold, the melting core which includes an inner ring making a ring shaped passage within a piston body, an outer ring and a plurality of coupling portions connected between the inner ring and the outer ring;

pouring molten metallic alloy into the cavity and solidifying therein;

removing the outer ring of the melting core therefrom;

filling a space left by said removal of the outer ring with reinforced material; and melting the inner ring and the coupling portions of the melting core.

2. The method of making a piston unit for an internal combustion engine as set forth in claim 1, wherein the melting core is made as one body.

3. The method of making a piston unit for an internal combustion engine as set forth in claim 2, wherein the melting core is formed from salt.

4. The method of making a piston unit for an internal combustion engine as set forth in claim 3, wherein the melting core is pinched at the outer end surface of the outer ring.

5. The method of making a piston unit for an internal combustion engine as set forth in claim 4, wherein at least one surface of the outer ring of the melting core has a taper surface thereon.

6. The method of making a piston unit for an internal combustion engine as set forth in claim 5, wherein the thickness of the outer end of the outer ring is bigger than the thickness of the inner end of the outer ring.

* * * * *